Oct. 9, 1956  J. B. ARMITAGE ET AL  2,765,711
MACHINE TOOL STRUCTURE
Original Filed Feb. 23, 1942  2 Sheets-Sheet 1

United States Patent Office 2,765,711
Patented Oct. 9, 1956

---

2,765,711

MACHINE TOOL STRUCTURE

Joseph B. Armitage, Wauwatosa, and Orrin W. Barker, New Berlin, Wis., assignors to Kearney & Trecker Corporation, West Allis, Wis., a corporation of Wisconsin Application June 24, 1946, Serial No. 678,818, now Patent No. 2,621,566, dated December 16, 1952, which is a division of application Serial No. 431,908, February 23, 1942, now Patent No. 2,407,913, dated September 17, 1946. Divided and this application September 8, 1952, Serial No. 308,424

6 Claims. (Cl. 90—16)

This invention relates generally to machine tools and more particularly to improved machine tool structure.

This specification constitutes a division of application Serial No. 678,818, filed June 24, 1946 and issued as Patent No. 2,621,566, dated December 16, 1952, which was a division of application Serial No. 431,908 filed February 23, 1942 and issued as Patent No. 2,407,913, dated September 17, 1946.

A general object of the invention is to provide improved structural arrangements for a machine tool.

Another object is to provide an improved construction of the guiding means for supporting a movable element of a machine tool.

Another object of this invention is to provide an improved structural arrangement for effecting accurate adjustment of a movable element of a machine tool.

A further object is to provide an improved clamping arrangement for a movable element of a machine tool.

According to this invention an improved arrangement is provided for supporting a spindle carrying head on a pair of uprights of a machine tool for vertical sliding movement. Angularly disposed guiding surfaces on the inner sides of the uprights and plane surfaces lying in a common plane at the forward edges of the uprights with respective complementary projecting surfaces formed on the sides and on projecting lugs of the head form the means for sliding engagement therebetween. Accurate adjustment between the spindle carrying head and the uprights is provided by an adjustable gib structure mounted on one of the projecting complementary surfaces of the head as a section thereof in sliding engagement with an angular guiding surface of the upright, whereby an adjustment of the gib structure will effect an accurate sliding engagement between the head and the uprights.

Likewise an improved clamping means is provided for a pair of overarms slidably mounted in horizontal bores in the spindle head. A horizontally extending kerf between the arm receiving bores provides a resilient portion that may be deflected by a clamping nut and clamping screw arrangement where the clamping screws are secured to the head beneath the kerf and the clamping nuts linked together for simultaneous operation for developing a uniformly equal clamping pressure on that portion of the overarms within the bores.

The invention is exemplified herein by an embodying machine tool structure, but it is to be understood that the particular apparatus set forth is intended to be illustrative only and that the various individual characteristics may be embodied in other structural forms, all coming within the range of equivalents of the features defined in the sub-joined claims.

The foregoing and other objects of this invention, which will be more readily discerned from the following detailed description, may be achieved by means of the illustrative apparatus depicted in and described herein in connection with the accompanying drawing, in which:

Fig. 3 is a detailed view in perspective of a clamping device for the overarm structure of the milling machine; and Fig. 4 is a fragmentary view in perspective showing the vertically movable spindle carrying head.

Figure 1:
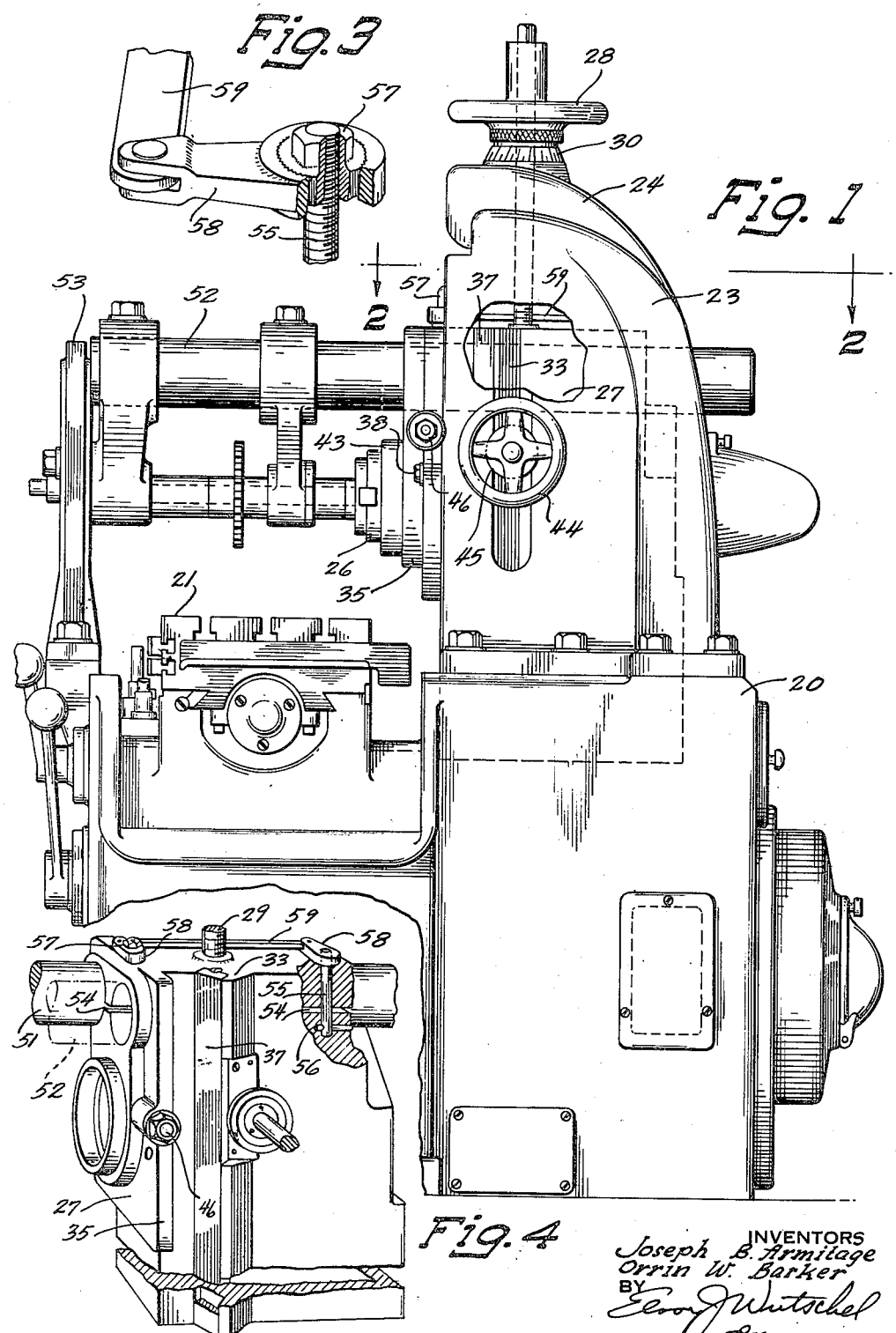
Figure 1 is a general view in side elevation of a machine tool in which the present invention may be incorporated to advantage.

The particular machine tool illustrated in the drawing as exemplifying a practical embodiment of the principals of the present invention, is a milling machine of the bed type, similar in general form and arrangement of parts to the milling machine shown in United States Patent No. 2,118,357 issued May 24, 1938.

Referring more specifically to Fig. 1 of the drawing, the milling machine thereshown comprises essentially a hollow bed or base 20 that constitutes the main supporting frame of the machine and forms a housing for the driving and controlling mechanism.

On the upper forward surface of the bed 20, a work supporting table 21 is slidably mounted for reciprocating movement longitudinally of the bed. At the rear of the table, a pair of uprights 22 and 23 are securely fixed to the upper surface of the bed 20 in spaced relationship and are joined at the top by a cap 24 to constitute a rigid upstanding column structure. As shown in Fig. 1, the column structure serves to support a rotatably mounted tool spindle 26 in cooperating relationship with the work table 21.

To provide for adjusting the position of the spindle 26 relative to the work table 21, the spindle is carried by a spindle supporting head or block 27 which is slidably mounted between the uprights 22 and 23 for vertical movement. Adjustment of the vertical position of the spindle head is effected by turning a combined hand wheel and nut 28 which abuts against the top of the cap 24 and has threaded engagement with a screw 29 the lower end of which is fixed in the spindle block 27, a graduated dial 30 being provided on the nut for indicating the amount of movement.

Figure 2:
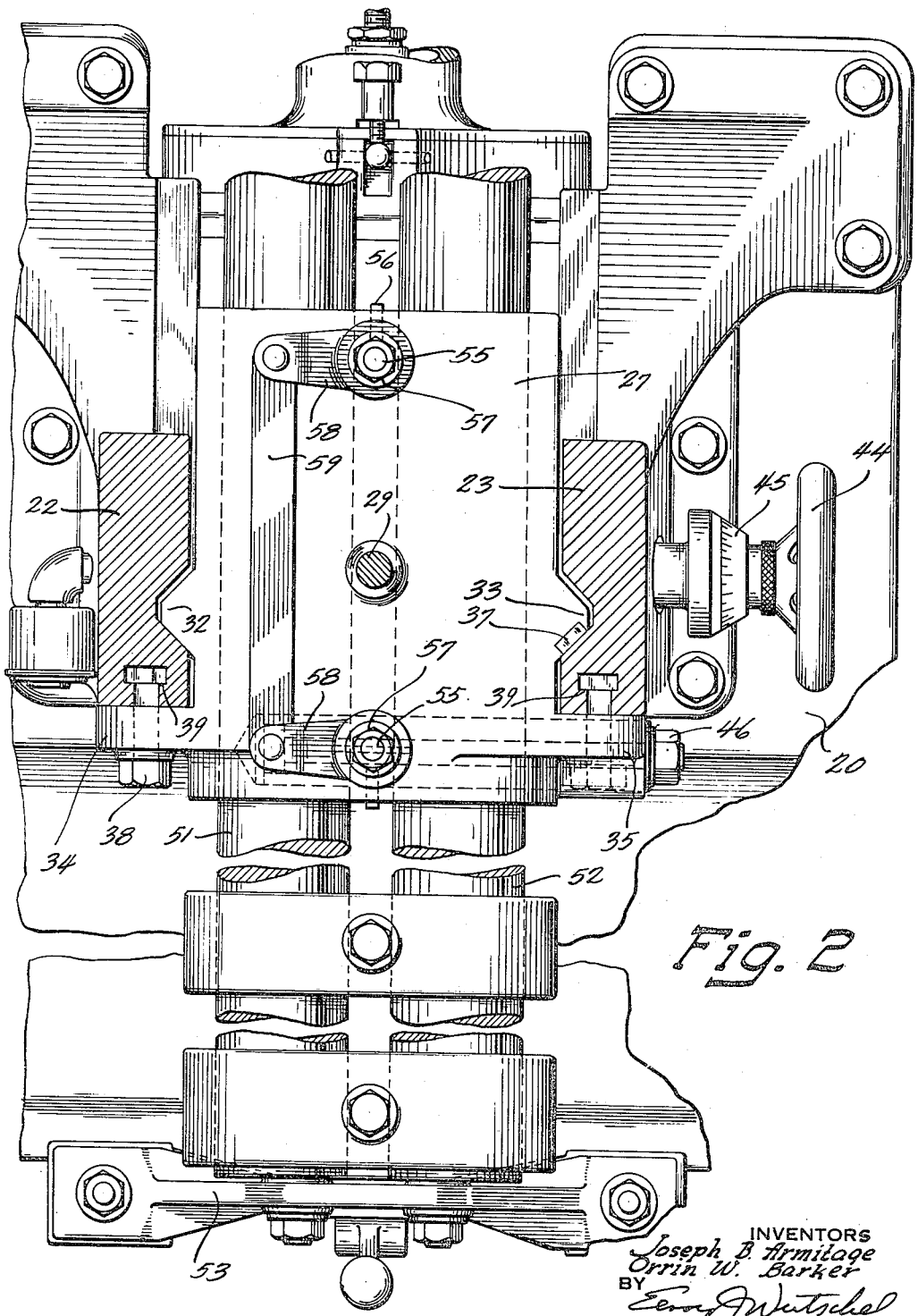
Fig. 2 is an enlarged fragmentary view partly in plan and partly in horizontal section, taken along the line 2—2 in Fig. 1.

As best shown in Fig. 2, the spindle head 27 is provided at its sides with projecting, angularly disposed vertical guiding ways 32 and 33, respectively. The forward sloping surfaces of the angular ways have sliding engagement with complementary angularly disposed surfaces formed in the uprights 22 and 23. At is forward edge, the spindle block 27 is provided with laterally projecting lugs 34 and 35 which have sliding engagement with flat ways formed in a common plane on the forward faces of the uprights 22 and 23 respectively. The angular way 33 on the head is provided with a tapered adjusting gib 37 which may be tightened to effect accurate sliding engagement between the head and the uprights. As may readily be seen, when the gib 37 is tightened it moves into engagement with the complementary way in the upright 23 and draws the lug 35 against the forward face of the upright. Simultaneously, the wedging action of the gib upon the agularly disposed sliding surface of the upright 23 forces the entire head 27 to the left and effects a similar wedging action between the sloping forward face of the way 32 and the plane face of the lug 34 upon the complementary surfaces of the upright 22, clearance spaces being provided between the other surfaces of the head and the uprights as indicated in the drawing. This arrangement provides for effecting close adjustment between the sliding head and the cooperating ways of the column structure, to insure accurate movement of the head. After the spindle head has been adjusted to bring the spindle 26 to the desired vertical position, by turning the hand wheel 28, the head 27 may be locked to the uprights by tightening clamping bolts 38 which operate in T-slots 39 in the forward faces of the uprights and project through the lugs 34 and 35 of the head to clamp them against the forward flat ways.

To provide for horizontal adjustment of the position of a cutter carried by the spindle 26, the spindle is rotatably supported, by means of antifriction bearings (not shown) in the ends of a cylindrical quill structure 43 which is slidably mounted for axial movement in the head 27, as shown in Fig. 1. Axial adjustment of the position of the quill is effected by turning a hand wheel 44 at the side of the upright 23, the hand wheel being operatively connected to the quill in well known manner and provided with a graduated dial 45 to indicate the longitudinal position of the spindle. After the spindle quill has been moved to an adjusted position, it may be clamped to the spindle block by turning a clamping nut 46 which draws a clamping element (not shown) into engagement with the quill.

Above the spindle 26, a pair of overarms 51 and 52 are slidably mounted in the spindle block 27 in a manner to extend forward to support a cutter carrying arbor, as shown in Fig. 1, the arms being connected at their forward ends to the bed 20 by means of a harness structure 53. As best shown in Fig. 4, the upper part of the head 27 is provided with a kerf 54 extending horizontally between the arm receiving bores to provide a resilient portion that may be deflected for clamping the arms. For this purpose, a clamping screw 55 is provided between the arms at each end of the head 27, the screws being fixed in the head beneath the kerf 54 by means of pins 56. Clamping nuts 57 are threaded on the upper ends of the screws 55 in manner to bear upon the top of the head and are adapted, when tightened, to deflect the upper portion of the head 27 downward into clamping engagement with the overarms through partially closing the kerf 54.

To provide for tightening the two clamping nuts simultaneously, each nut is fitted with an arm 58 the arms being interconnected by a link 59 pivoted at its respective ends to the end of each arm. As shown in Fig. 2, the forward nut 57 is provided with a wrench receiving hexagonal top by means of which both nuts may be tightened to clamp the overarms equally at both ends of the head. As best shown in Fig. 3, each nut 57 is provided with peripheral serrations which are engaged by complementary internal serrations in the cooperating arm 58. By reason of this serrated connection, each arm 58 may be adjusted angularly relative to its cooperating nut 57 in manner to equalize the clamping pressure exerted at the respective ends of the head 27. This arrangement provides for correcting any inequality which may result from wear between the nuts and the screws or the head, since the arms may be removed readily from the nuts at any time and re-engaged with the nut serrations at the position of adjustment providing for equal clamping pressures.

From the foregoing description of a milling machine embodying the present invention and the explanation of its operation it should be apparent that there has been provided an improved machine tool structure that will effect accurate adjustment of a spindle carrying head and that may be maintained with facility.

Although the illustrative embodiment of the invention has been described in considerable detail for the purpose of fully disclosing a practical operative structure by means of which the particular apparatus herein described is intended to be illustrative only and that the various novel characteristics of the invention may be incorporated in other structural forms without departing from the spirit and scope of the invention as defined in the subjoined claims.

The invention is hereby claimed as follows:

1. In a machine tool, a frame, a pair of uprights mounted in spaced apart parallel relationship on said frame, said uprights presenting forwardly facing guiding surfaces lying in parallel planes and with said uprights being each provided with a rearwardly facing angularly disposed guiding surface upon its inner side face, a spindle carrying head provided with a pair of laterally extending forwardly facing angular guiding surfaces complementary to those of said uprights and disposed for sliding movement between said uprights, said spindle carrying head being further provided with a pair of outwardly extending portions respectively presenting rearwardly facing guiding surfaces lying in parallel planes and adapted to slidably engage said forwardly facing guiding surfaces respectively presented by said uprights, a gib operatively disposed between said spindle carrying head and one of said uprights in engagement with an associated pair of the angularly disposed guiding surfaces respectively presented by said head and said upright, and a cap fixedly secured to the upper ends of said uprights, said cap being removable from said uprights to permit upward removal of said spindle head from between said uprights.

2. In a machine tool, a base, a pair of uprights secured to said base in spaced apart parallelism, a spindle head slidably carried between said uprights for selective vertical adjustment, said spindle head being provided with a pair of horizontal bores extending from end to end thereof, a cap member secured to the upper ends of said uprights in a manner to overlie said spindle head, a pair of overarms respectively slidably mounted in the bores of said spindle head, a wall separating the bores in said spindle head divided into a deflectable upper section and a lower section by a horizontal kerf extending throughout the length of said wall, a pair of spaced apart clamping screws freely mounted in the upper section of said wall and secured to the lower section of said wall, a pair of clamping nuts respectively mounted on said clamping screws and bearing upon the upper surface of said spindle head whereupon the tightening of said clamping nuts will downwardly deflect the upper section of said wall to constrict the bores of said spindle head and thereby cause a clamping pressure to be exerted against said overarms which will clamp said overarms in any predetermined position, one of said nuts being spaced toward the forward portion of said spindle head for convenient accessibility and the other of said nuts being positioned toward the rearward portion of said spindle head in a relatively inaccessible position, and a linking means to interconnect said clamping nuts for simultaneous operation to provide an instantaneous uniform clamping pressure on the overarms throughout the length of the bores in said spindle head.

3. In a machine supporting structure for a tool, a frame, a pair of uprights mounted in spaced apart relationship on said frame, said uprights presenting a pair of forwardly facing way surfaces lying in the same plane, said uprights presenting a pair of rearwardly facing angularly disposed way surfaces spaced rearwardly from the forward surfaces, a spindle head mounted between said uprights for vertical sliding movement, said spindle head presenting four spaced apart way surfaces complementary to the way surfaces presented by said uprights, said spindle head having a pair of horizontal bores, a cap member secured to the upper ends of said uprights in a manner to overlie said spindle head, a pair of overarms respectively slidably mounted in the bores of said spindle head, a wall separating the bores in said spindle head divided into a downwardly deflectable upper section and a lower section by a horizontal kerf extending throughout its length, a pair of spaced apart clamping screws mounted in said wall and secured to the lower section of said wall, a pair of clamping nuts respectively mounted on said clamping screws and bearing upon the upper surface of said spindle head whereupon the tightening of said clamping nuts will downwardly deflect the upper section of said wall to constrict the bores of said spindle head and thereby cause a clamping pressure to be exerted against said overarms which will clamp said overarms in any predetermined position, a linking means to interconnect said clamping nuts for simultaneous operation to provide a uniform clamping pressure on said overarms throughout the length of the bores of said spindle head, and clamping means operatively disposed to clamp said spindle head to said uprights.

4. In a machine tool, a base, a pair of vertically upstanding uprights fixedly secured to said base in parallel spaced apart relationship, said uprights being provided with spaced apart forwardly facing flat vertical guideways formed in parallel planes, said uprights respectively presenting rearwardly facing flat spaced apart vertical guideways formed in oppositely diverging angularly vertical planes with respect to each other and to the vertical plane of the front guideways, a spindle carrying head removably constrained between said uprights for selective vertical adjustment and presenting four vertically formed way surfaces spaced apart in quadrilateral relationship and being complementary to the flat guideways presented by said uprights, said head being restrained against tilting movement by the four spaced apart flat guideways presented by said uprights which cooperate to constitute a vertical channel for guiding said head during vertical movement, said head being removable from guiding engagement with said uprights by lifting said head vertically to clear the upper ends of said uprights, adjustable gib means operatively interposed between one of the angular vertical way surfaces of said head and the complementary angular guideway presented by one of said uprights, said gib means being adjustable to retain the way surfaces of said head in snug guiding engagement with the way surfaces presented by said column, and a removable cap member fixedly secured to the upper ends of said uprights to restrain said uprights against lateral deflection.

5. In a machine tool, a frame, a pair of uprights mounted on said frame in parallel spaced apart relationship and presenting a pair of forwardly facing vertical flat way surfaces lying in the same plane, said uprights being respectively provided with offset rearwardly facing angularly extending vertical way surfaces spaced rearwardly from said front way surfaces, a spindle head slidably constrained between said uprights for selective vertical adjustment, said spindle head being provided with laterally extending flanged way surfaces disposed to slidably engage the forwardly facing front way surfaces respectively presented by said uprights, said spindle head being provided with laterally extending angularly formed way surfaces disposed to respectively cooperate with the rearwardly facing angular way surfaces presented by said uprights, gib means operatively positioned between one of the angular way surfaces presented by said head and the associated angular way surface presented by one of said uprights, the arrangement being such that said spindle head is retained between said uprights even with said gib means removed, and a cap member removably secured to the upper ends of said uprights to restrain said uprights against lateral deflection and being removable therefrom to permit upward removal of said spindle head from between said uprights.

6. In a machine tool, a guiding frame, a spindle head carried for selective vertical adjustment in said frame, said spindle head being provided with a pair of horizontally extending bored openings, a pair of longitudinally movable overarms slidably carried in the bored openings formed in said spindle head, a wall separating the bored openings in said spindle head divided into a deflectable upper section and lower section by a horizontal slot extending throughout the length of said wall, a pair of spaced apart clamping screws freely mounted in the upper section of said wall and secured to the lower section of said wall, a pair of clamping nuts respectively engaging said clamping screws and bearing upon the upper surface of said spindle head in a manner that tightening of said clamp nuts deflects the upper section of said wall downwardly to constrict the bored openings in said spindle head to clamp said overarms in predetermined adjusted position, an elevating screw threadedly engaging said spindle head intermediately of said clamping screws, said elevating screw being journalled at its opposite end in said frame for effecting selective vertical adjustment of said spindle head relative to said frame, a pair of movable crank arms, each of said crank arms being secured to a respective one of said clamping nuts, and an actuating link pivotally secured at its opposite ends to the outer ends of said crank arms whereby actuating one of said clamping nuts effects a coordinate operation of the other of said clamping nuts to effect an equalized clamping of said overarms within said spindle head.

References Cited in the file of this patent

UNITED STATES PATENTS

| | | |
|---|---|---|
| 660,200 | Richards | Oct. 23, 1900 |
| 1,132,534 | Deleeuw | Mar. 16, 1915 |
| 1,540,132 | Johannesmeyer et al. | June 2, 1925 |
| 1,706,587 | Parsons | Mar. 26, 1929 |
| 1,835,782 | Kearney | Dec. 8, 1931 |
| 1,886,833 | Parsons | Nov. 8, 1932 |
| 1,940,443 | Blood | Dec. 19, 1933 |
| 2,260,098 | Blood | Oct. 21, 1941 |